(12) United States Patent
Beaurivage

(10) Patent No.: US 11,897,621 B2
(45) Date of Patent: Feb. 13, 2024

(54) DEVICE TO DETECT DEPLOYMENT OF A PARACHUTE

(71) Applicant: Justin Beaurivage, Victoriaville (CA)

(72) Inventor: Justin Beaurivage, Victoriaville (CA)

( * ) Notice: Subject to any disclaimer, the term of this patent is extended or adjusted under 35 U.S.C. 154(b) by 186 days.

(21) Appl. No.: 17/590,230

(22) Filed: Feb. 1, 2022

(65) Prior Publication Data
US 2023/0242262 A1 Aug. 3, 2023

(51) Int. Cl.
*B64D 17/62* (2006.01)

(52) U.S. Cl.
CPC .................................. *B64D 17/62* (2013.01)

(58) Field of Classification Search
CPC ......... B64D 17/00; B64D 17/38; B64D 17/62
See application file for complete search history.

(56) References Cited

U.S. PATENT DOCUMENTS

| | | | | |
|---|---|---|---|---|
| 3,954,234 A | * | 5/1976 | Frost | G05G 17/00 285/190 |
| 6,059,232 A | * | 5/2000 | Sato | B64D 17/76 244/149 |
| 2014/0034888 A1 | * | 2/2014 | Kingery | A44B 11/00 254/391 |
| 2019/0144123 A1 | * | 5/2019 | Carter | B64D 17/40 244/148 |
| 2021/0403153 A1 | * | 12/2021 | Anderson | B64D 25/00 |

* cited by examiner

*Primary Examiner* — Justin M Benedik
(74) *Attorney, Agent, or Firm* — COATS & BENNETT, PLLC

(57) ABSTRACT

A device that detects deployment of a parachute. The device is configured to be operatively connected to the parachute, such as through a container that holds the parachute. The device includes a cable with one or more connectors. The device also includes a controller that monitors a status of the cable. The cable is operatively connected to the container such as through a line. The container opens during deployment of the parachute. This opening causes one or more of the connectors to disengage thus causing an open circuit in the cable that is detected by the controller.

19 Claims, 7 Drawing Sheets

DEVICE TO DETECT DEPLOYMENT OF A PARACHUTE

BACKGROUND

A parachute is a device that fills with air to allow a person or object to descend slowly when dropped from an aircraft. The parachute includes a canopy that is usually made of a strong, light-weight fabric such as nylon. Suspension lines are attached to the canopy and spread the weight of the user across the canopy. A harness includes various straps and fittings to be secured to the user. Risers are secured to the harness and attach to the suspension lines at links.

The parachute is packed into a container prior to deployment. The container is closed prior to use to protect the parachute and maintain the parachute in a condition ready for deployment. The container is further configured to be opened to allow the parachute to move out of the container and to deploy.

Often times, a person or object will be equipped with multiple parachutes. These are often referred to as a main parachute that is normally deployed during a jump. A second parachute canopy or wing is referred to as a reserve chute and is deployed in the event the main parachute does not deploy or is otherwise not functioning properly. There is a need for a reliable device to determine when a container has been opened and a parachute has been deployed. This is applicable to both deployment of a main chute and/or a reserve chute.

SUMMARY

One aspect is directed to a device to detect deployment of a parachute. The device comprises a cable engaged by a member of or attached to the parachute; a break section positioned along the cable and having a lower tensile strength than the cable, the break section is movable between an engaged position that forms a closed circuit in the cable and a disengaged position that forms an open circuit in the cable; and a controller comprising processing circuitry configured to detect that the cable is in the open circuit caused by the parachute moving away from the cable upon deployment.

In another aspect, the device further comprises a power source and a conductive element that extends through the cable with the conductive element configured to pass an electrical charge from the power source and wherein the processing circuitry is configured to detect the open circuit and that electrical current is not passing along the conductive element.

In another aspect, the cable comprises a conductor configured for a signal to pass along a length of the cable.

In another aspect, the break section is a first break section and further comprising a second break section positioned along the cable and spaced away from the first break section with the second break section movable between an engaged position that forms the closed circuit and a disengaged position that forms the open circuit.

In another aspect, the break section comprises first and second plugs configured to mate together an in the engaged position have a lower tensile strength than the cable for the first and second plugs to disengage prior to a break in the cable when the parachute moves away from the cable upon the deployment.

In another aspect, the first and second plugs comprise a male plug and a female plug having complementary shapes and sizes with the male plug engaged with the female plug in the engaged position.

One aspect is directed to a device to detect deployment of a parachute. The device comprises a cable configured to be connected to the parachute with the cable comprising a break with a first end and a second end. A break section is positioned at the break in the cable and comprises a first plug mounted at the first end of the cable and a second plug mounted at the second end of the cable. The first and second plugs are movable between an engaged position that forms a closed circuit in the cable and a disengaged position that forms an open circuit in the cable. A controller comprising processing circuitry is configured to detect the open circuit caused by the parachute moving away from the cable upon deployment.

In another aspect, the controller is configured to detect that the first and second plugs are in the disengaged position.

In another aspect, the device further comprises a power source and an electrically conductive element that extends through the cable.

In another aspect, the first plug is a male plug and the second plug is a female plug with the male plug shaped and sized to fit within a receptacle of the female plug in the engaged position.

In another aspect, the cable comprises a conductive element configured for a signal to pass along a length of the conductive element.

In another aspect, the conductive element is configured to pass an optical signal along the length of the conductive element.

In another aspect, the break section is a first break section and further comprising a second break section positioned along the cable and spaced away from the first break section with the second break section movable between an engaged position that forms the closed circuit and a disengaged position that forms the open circuit.

In another aspect, the break section comprises a lower tensile strength than the cable for the break section to separate prior to a break in the cable when the parachute moves away from the cable upon the deployment.

One aspect is directed to a device to detect deployment of a parachute. The device comprises an electrically conductive cable configured to be operatively connected to the parachute. A break section is positioned along the cable and being weaker than the cable with the break section movable between an engaged position and a disengaged position. A controller comprises a power source to energize the cable, and processing circuitry configured to detect an open circuit in the cable caused by the break section being in the disengaged position.

In another aspect, the break section comprises a first male plug and a second female plug wherein the male plug is shaped and sized to fit within a receptacle of the female plug in the engaged position.

In another aspect, the cable comprises a conductive element configured for a signal to pass along a length of the conductive element.

In another aspect, the break section is a first break section and further comprising a second break section positioned along the cable and spaced away from the first break section with the second break section movable between an engaged position that forms the closed circuit and a disengaged position that forms the open circuit.

In another aspect, the break section comprises a lower tensile strength than the cable for the break section to separate prior to a break in the cable when the parachute moves away from the cable upon the deployment.

The various aspects of the various embodiments may be used alone or in any combination, as is desired.

DETAILED DESCRIPTION

Figure 1:
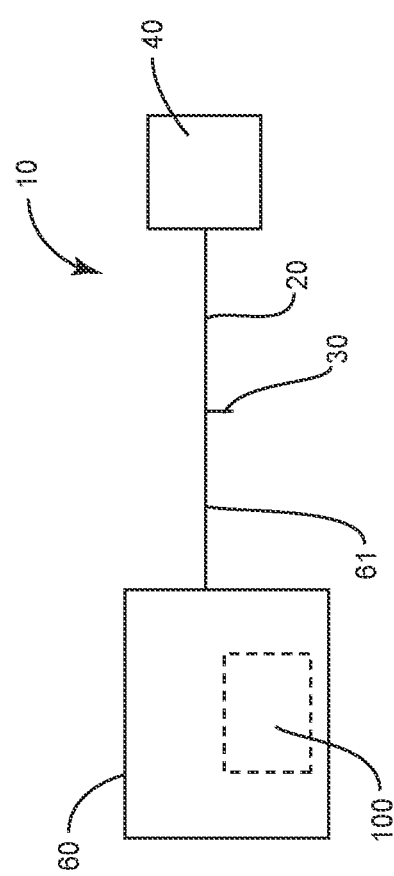
FIG. 1 is a schematic diagram of a device operatively connected to a parachute through a container that holds the parachute.

The present application is directed to a device that detects deployment of a parachute. FIG. 1 schematically illustrates the device 10 operatively connected to the parachute 100. In this example, the connection is through a container 60 that holds the parachute 100. The device 10 includes a cable 20 with one or more break sections 30. The device 10 also includes a controller 40 that monitors a status of the cable 20. The cable 20 is operatively connected to the container 60, such as through a line 61. The container 60 opens during deployment of the parachute 100. This opening causes one or more of the break sections 30 along the cable 20 to disengage thus causing an open circuit in the cable 20 that is detected by the controller 40.

Figure 2:
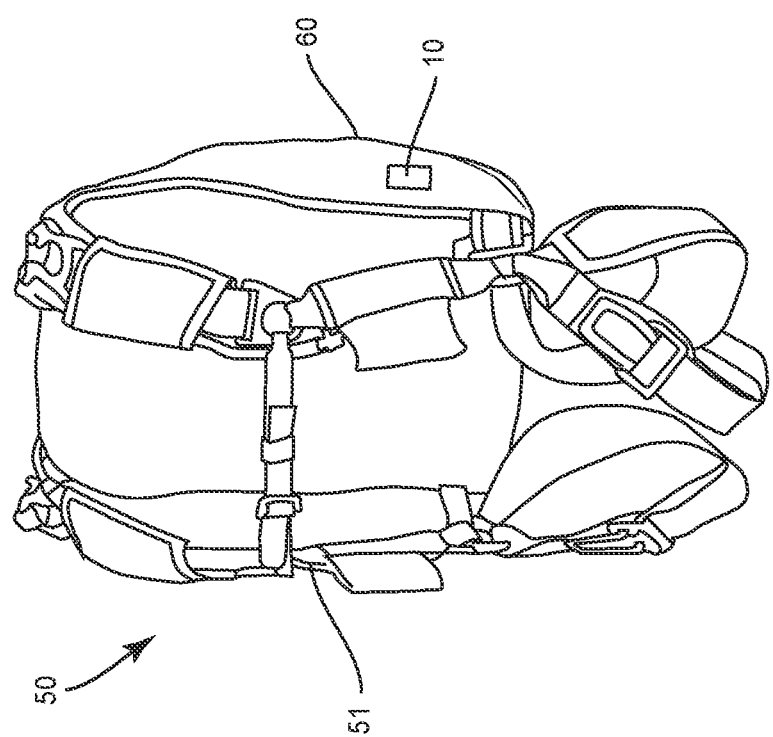
FIG. 2 is a perspective view of a device attached to a parachute assembly.

FIG. 2 illustrates the device 10 attached to a parachute assembly 50. The parachute assembly 50 is configured to be worn by a person and includes a harness 51 with shoulder and leg straps. The parachute assembly 50 also includes a container 60 that contains a parachute (not illustrated in FIG. 2). The device 10 is positioned to detect deployment of the parachute 100. In one example, the device 10 detects the opening of the container 60 during deployment of the parachute 100. In another example, the device 10 is connected to the parachute 100 to detect the deployment. In one example, the device 10 detects deployment of the reserve parachute from a reserve container 60. In another example, the device 10 detects deployment of the main parachute from a main container 60.

Figure 3:
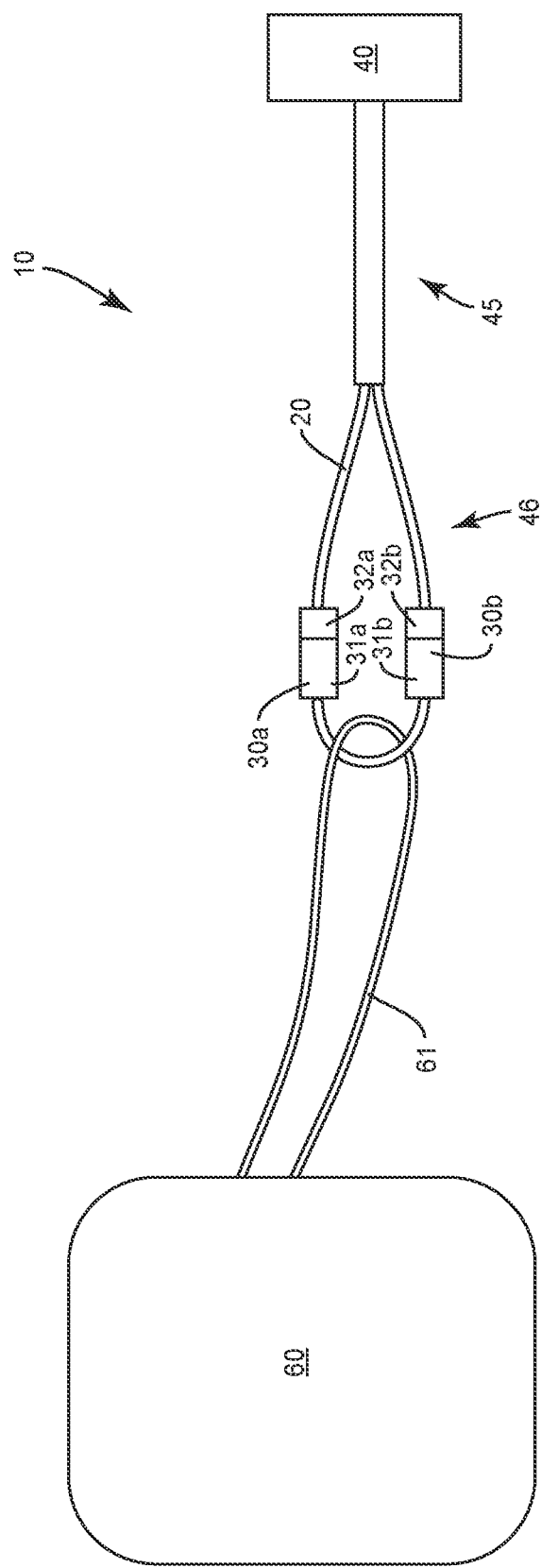
FIG. 3 is a side schematic view of a device operatively connected to a parachute.

The cable 20 is sized to be operatively connected to the parachute 100. The length and size of the cable 20 can vary depending upon the parachute assembly 50. In one example, the cable 20 forms a loop as illustrated in FIG. 3. The loop facilitates attachment to the parachute 100.

The cable 20 forms a closed circuit that provides a path along which a signal can pass. In one example the cable 20 includes an electrically conductive member. In one example, the cable 20 includes one or more wires that extend along the length and form a path for an electrical charge to pass. Additionally or alternatively, the one or more wires are configured to pass various electrical signals. In another example, the cable 20 includes an optical fiber and is configured for an optical signal to pass along the length. A protective coating can be placed around the conductive members to provide protection. When the cable 20 is attached to the parachute 100 prior to deployment, a signal is transmitted along the closed circuit of the cable 20.

One or more break sections 30 are positioned along the length of the cable 20. The one or more break sections 30 are weaker than the cable 20 to disengage upon deployment of the parachute 100. The break sections 30 are movable between an engaged position in which the closed circuit is maintained, and a disengaged position which opens the circuit. The break sections 30 are configured to move to the disengaged position during deployment of the parachute 100. The controller 40 detects the open circuit and determines that the parachute 100 has been deployed. In one example, the break sections 30 include a lower tensile strength than the cable 20. This lower tensile strength provides for the break sections 30 to disengage during deployment. In one example, one or more of the break sections 30 are configured to be reused without damaging the cable 20. This difference in tensile strength protects the cable 20 and provides for the device 10 to be used repeatedly to detect parachute deployment.

In one example as illustrated in FIG. 3, each break section 30 is positioned at a break in the cable 20. The break section 30 includes a first plug 31 at a first break end of the cable 20 and a second plug 32 at a second break end. The plugs 31, 32 can include bodies that are shaped and sized to engage together. In one example, one of the plugs 31, 32 forms a receptacle and the opposing plug 31, 32 is sized to be inserted into the receptacle. In one example, plug 31 is a male configuration that fits into a receptacle in female section 32. The plugs 31, 32 engage together to complete the circuit. The plugs 31, 32 are configured to remain engaged together to complete the electrical circuit while the container 60 is closed and disengage and open the electrical circuit when the container 60 is opened. In one example, the plugs 31, 32 are sized to farm a friction fit to maintain the engagement. In another example, the plugs 31, 32 include mating features such as a ball-and-detent or ramped configuration to create a mechanical connection to maintain the engaged configuration. In one example, the connector 40 includes a single plug 31 is mounted along the cable and attaches to a receptacle in the housing 49 of the controller 40.

Figure 4:
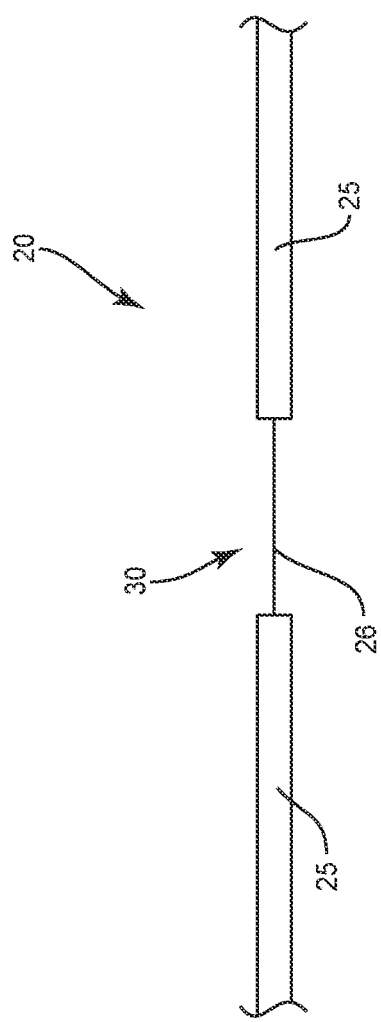
FIG. 4 is a partial side view of a break section positioned along a cable.

FIG. 4 illustrates a break section 30 positioned along a cable 20. The break section 30 includes a conductive element 26. A protective cladding 25 is placed along adjacent sections of the cable 20. The conductive element 26 at the break section 30 includes a lower tensile strength than the adjacent sections that also includes the cladding 25. During deployment of a parachute 100, the force applied to the cable 20 causes the conductive element 26 to break at the break section 30. The stronger adjacent sections that include the conductive element 26 and cladding 25 remains. In one example, the break section 30 can be further weakened, such as by notches or cuts in the conductive element 26.

Figure 5:
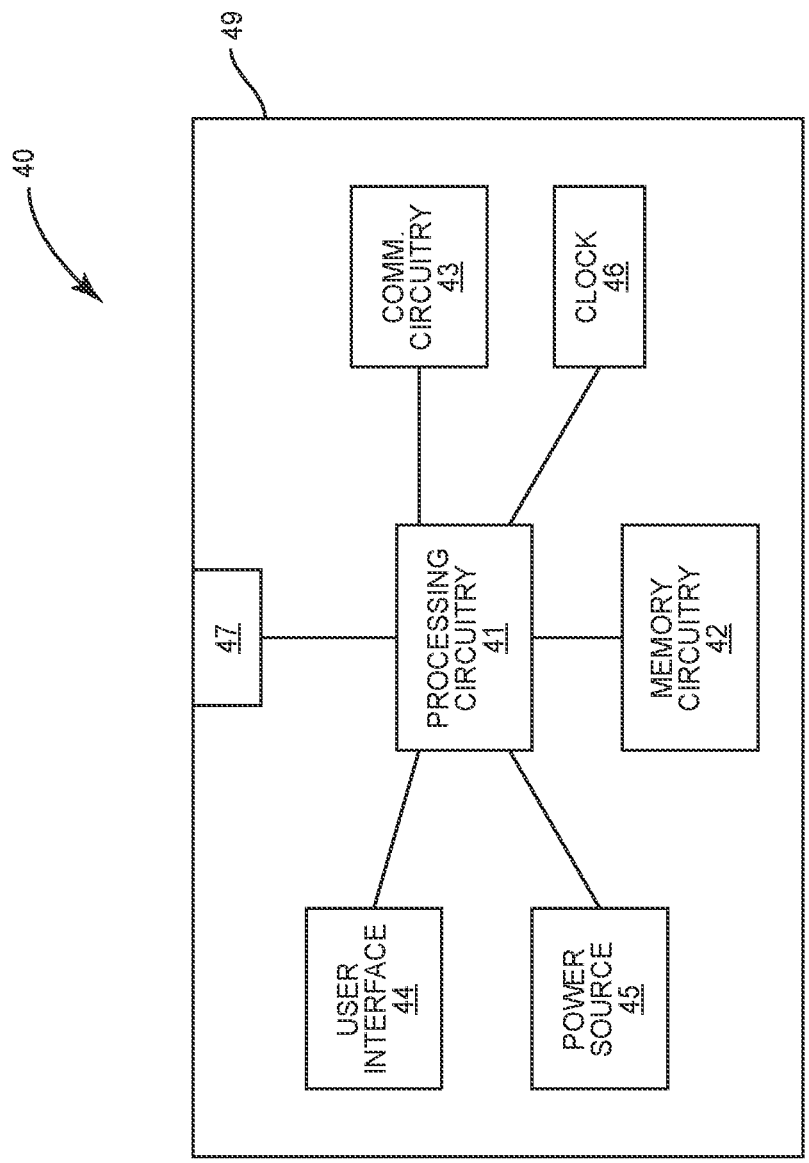
FIG. 5 is a schematic diagram of a processor of a device.

The controller 40 is configured to monitor the status of the cable 20 and thus the deployment of the parachute 100. FIG. 5 illustrates the controller 40 that includes a control circuit 41 and a memory circuit 42. The control circuit 41 controls overall operation of the device 10 according to program instructions stored in the memory circuit 42. The control circuit 41 can include one or more circuits, microcontrollers, microprocessors, hardware, or a combination thereof. Memory circuit 42 includes a non-transitory computer readable storage medium storing program instructions, such as a computer program product, that configures the control circuit 41 to implement one or more of the techniques discussed herein. Memory circuit 42 can include various memory devices such as, for example, read-only memory, and flash memory. Memory circuit 42 can be a separate component as illustrated in FIG. 5 or can be incorporated with the control circuit 41. Alternatively, the control circuit 41 can omit the memory circuit 42, e.g., according to at least some embodiments in which the control circuit 41 is dedicated and non-programmable.

The control unit 40 is configured to communicate the status of the parachute 100, such as indicating whether the parachute is contained or deployed. The communications can be to various parties, including but not limited to the person using the parachute, other persons that are jumping with the person, a pilot, and various parties on the ground. In one example, the device 10 communicates with a jump computer that is worn by the person that is using the parachute 100. Communications can include both incoming and outgoing communications.

A communications circuit 43 provides for this communication functionality. The communications circuit 43 can include one or more interfaces that provide for different methods of communication. The communications circuit 43 can include a cellular interface that enables communication with a mobile communication network (e.g., a WCDMA, LTE, WiMAX, or other radio communications network). The communication circuit 43 can further include a personal area network interface, such as a Bluetooth interface. The communication circuit 43 can also include a Near Field Communication interface that provides for short-range wireless connectivity technology that uses magnetic field induction to permit devices to share information with each other over short distances. In one example as illustrated in FIG. 5, the communications circuit 43 is incorporated into the control unit 40. In another example, the communications circuit 43 is a separate system that is operatively connected to and controlled by the control unit 40.

A user interface 44 provides for an operator to control one or more aspects of the device 10. The user interface 44 can include one or more input devices such as but not limited to a keypad, touchpad, roller ball, and joystick. The one or more input devices provide for the operator to enter commands to the control circuit 41. The user interface 44 can also include one or more displays for displaying information to the operator.

A power source 45 provides power to the controller 40. The power source 45 can also provide an electrical charge to the cable 20. In one example, the power source 45 includes one or more batteries. A clock 46 can provide timing aspects for the device 10. A port 47 can provide for connecting with the cable 20. In one example, the port 47 comprises one or more receptacles. The controller 40 can be contained within a protective outer housing 49. The housing 49 can be constructed of a rigid material, such as hardened plastic or metal, to protect the interior components.

The processing circuitry 41 is also configured to provide for the signal to be sent through the cable 20, and to detect the status of the cable 20 and whether one or more of the break sections 30 are disengaged. In one example, the processing circuitry 41 is configured to provide for a charge from the power source 45 to be transmitted along the cable 20. The processing circuitry 41 is further configured to detect the current along the cable 20 to detect whether there is an open circuit or a closed circuit. Additionally or alternatively, the processing circuitry 41 includes a transmitter and receiver for optical and electrical signals. The transmitter transmits the signals along the cable 20 and the receiver receives the signals when the cable 20 forms a closed circuit.

Figure 6:
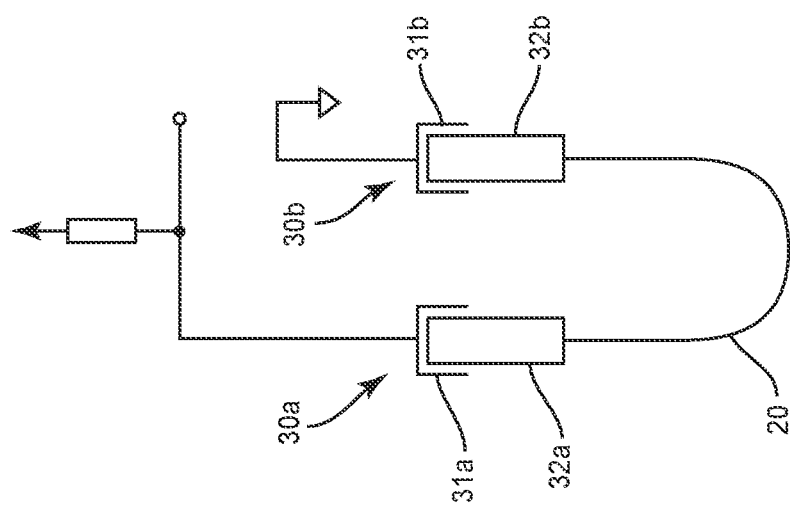
FIG. 6 is a schematic diagram of an electrical circuit of a device.
Figure 7:
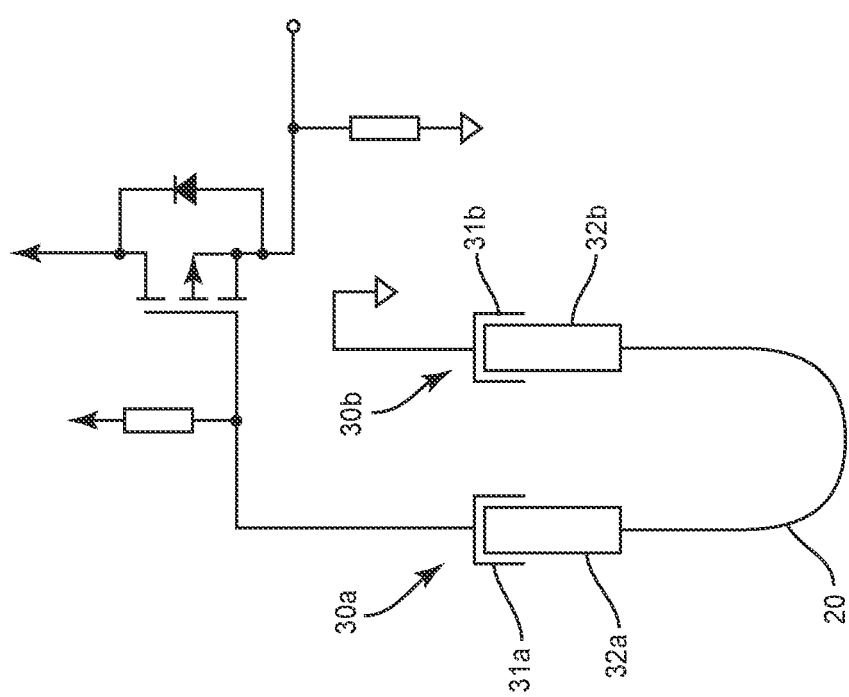
FIG. 7 is a schematic diagram of an electrical circuit of a device.

Detecting the status of the cable 20 can be achieved by the controller 40 in various manners. FIGS. 6 and 7 illustrate examples that include a simple transistor circuit and a microcontroller input with a pullup resistor.

In one example as illustrated in FIG. 1, a single break section 30 is positioned along the cable 20. In other examples as illustrated in FIG. 3, two or more break sections 30 are positioned along the length. One advantage of multiple break sections 30 is having one or more redundant break sections 30 in the event that one of the break sections 30 is incapable of moving from the engaged to disengaged position. One or more of the redundant break sections 30 can disengage to provide a signal to the controller 40.

In one example, the break sections 30 in the engaged position and/or the cable 20 are configured with a tensile strength to ensure deployment of the parachute 100. Even if the one or more break sections 30 do not move to the disengaged position, one or both of the cable 20 and the engaged break sections 30 will fail thus ensuring deployment of the parachute 100.

The cable 20 can be operatively connected to the parachute 100 in a variety of different manners. In one example, the cable 20 is directly connected to a flap on the container 60. The flap moves between the closed and open orientations thus applying a force to the cable 20 that disengages one or more of the break sections 30. In another example as illustrated in FIG. 3, the cable 20 is connected to a line 61 that extends from the container 60. In one example, the line is a static line. In another example, the cable 20 is connected directly to the parachute 100.

In use, the device 10 is positioned with the cable 20 operatively connected to the parachute 100. The one or more break sections 30 are in the engaged position and the cable 20 forms a closed circuit. The controller 40 monitors the cable 20 and detects the closed circuit and that the break sections 30 are in the engaged position indicating that the parachute has not deployed.

When the parachute 100 is deployed, the deployment causes a force to be applied to the cable 20. The force is configured to disengage one or more of the break sections 30 and open the circuit formed by the cable 20. The processor 40 detects the change in the circuit from a closed circuit to an open circuit and determines that the parachute 100 has deployed.

In one example, the device 10 can be reused multiple times to detect parachute deployment. Reuse includes re-engaging the one or more break sections 30 to reform the closed electrical circuit and reconnecting the cable 20 to the parachute 100.

In one example, the device 10 is used to detect deployment of a reserve parachute 100. In another example, the device 10 is used to detect deployment of the main parachute 100. In another example, both a main parachute and a reserve parachute 100 are connected to the device 10. Deployment of either parachute 100 causes a break in one or more of the break sections 30 which is used to determine the deployment of either parachute 100.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A device to detect deployment of a parachute, the device comprising:
   a cable engaged by a member of or attached to the parachute;
   a break section positioned along the cable and having a lower tensile strength than the cable, the break section is movable between an engaged position that forms a closed circuit in the cable and a disengaged position that forms an open circuit in the cable; and
   a controller comprising processing circuitry configured to detect that the cable is in the open circuit caused by the parachute moving away from the cable upon deployment.

2. The device of claim 1, further comprising:
   a power source;
   a conductive element that extends through the cable, the conductive element configured to pass an electrical charge from the power source; and
   wherein the processing circuitry is configured to detect the open circuit and that electrical current is not passing along the conductive element.

3. The device of claim 1, wherein the cable comprises a conductor configured for a signal to pass along a length of the cable.

4. The device of claim 1, wherein the break section is a first break section and further comprising a second break section positioned along the cable and spaced away from the first break section, the second break section movable between an engaged position that forms the closed circuit and a disengaged position that forms the open circuit.

5. The device of claim 1, wherein the break section comprises first and second plugs configured to mate together and in the engaged position having a lower tensile strength than the cable for the first and second plugs to disengage prior to a break in the cable when the parachute moves away from the cable upon the deployment.

6. The device of claim 5, wherein the first and second plugs comprise a male plug and a female plug having complementary shapes and sizes with the male plug engaged with the female plug in the engaged position.

7. A device to detect deployment of a parachute, the device comprising:
   a cable configured to be connected to the parachute, the cable comprising a break with a first end and a second end;
   a break section positioned at the break in the cable, the break section comprising:
      a first plug mounted at the first end of the cable;
      a second plug mounted at the second end of the cable;
      the first and second plugs movable between an engaged position that forms a closed circuit in the cable and a disengaged position that forms an open circuit in the cable; and
   a controller comprising processing circuitry configured to detect the open circuit caused by the parachute moving away from the cable upon deployment.

8. The device of claim 7, wherein the controller is configured to detect that the first and second plugs are in the disengaged position.

9. The device of claim 7, further comprising:
   a power source; and
   an electrically conductive element that extends through the cable.

10. The device of claim 7, wherein the first plug is a male plug and the second plug is a female plug, wherein the male plug is shaped and sized to fit within a receptacle of the female plug in the engaged position.

11. The device of claim 7, wherein the cable comprises a conductive element configured for a signal to pass along a length of the conductive element.

12. The device of claim 11, wherein the conductive element is configured to pass an optical signal along the length of the conductive element.

13. The device of claim 7, wherein the break section is a first break section and further comprising a second break section positioned along the cable and spaced away from the first break section, the second break section movable between an engaged position that forms the closed circuit and a disengaged position that forms the open circuit.

14. The device of claim 7, wherein the break section comprises a lower tensile strength than the cable for the break section to separate prior to a break in the cable when the parachute moves away from the cable upon the deployment.

15. A device to detect deployment of a parachute, the device comprising:
   an electrically conductive cable configured to be operatively connected to the parachute;
   a break section positioned along the cable and being weaker than the cable, the connector movable between an engaged position and a disengaged position; and
   a controller comprising:
      a power source to energize the cable;
      processing circuitry configured to detect an open circuit in the cable caused by the break section being in the disengaged position.

16. The device of claim 15, wherein the break section comprises:
   a first male plug;
   a second female plug; and
   wherein the male plug is shaped and sized to fit within a receptacle of the female plug in the engaged position.

17. The device of claim 15, wherein the cable comprises a conductive element configured for a signal to pass along a length of the conductive element.

18. The device of claim 15, wherein the break section is a first break section and further comprising a second break section positioned along the cable and spaced away from the first break section, the second break section movable between an engaged position that forms the closed circuit and a disengaged position that forms the open circuit.

19. The device of claim 15, wherein the break section comprises a lower tensile strength than the cable for the break section to separate prior to the cable when the parachute moves away from the cable upon the deployment.

* * * * *